United States Patent [19]

Winkler

[11] Patent Number: 5,694,256

[45] Date of Patent: Dec. 2, 1997

[54] OPTICAL READING DEVICE

[75] Inventor: Kurt Winkler, Rosstal, Germany

[73] Assignee: Eschenbach Optik GmbH & Co., Nuremberg, Germany

[21] Appl. No.: 596,145

[22] PCT Filed: Jul. 28, 1994

[86] PCT No.: PCT/DE94/00881

§ 371 Date: Feb. 5, 1996

§ 102(e) Date: Feb. 5, 1996

[87] PCT Pub. No.: WO95/04950

PCT Pub. Date: Feb. 16, 1995

[30] Foreign Application Priority Data

Aug. 5, 1993 [DE] Germany .......... 93 11 692 U

[51] Int. Cl.$^6$ .................................................. G02B 27/02
[52] U.S. Cl. .................................. 359/805; 359/803
[58] Field of Search ..................... 359/802, 803, 359/805, 809

[56] References Cited

U.S. PATENT DOCUMENTS

| | | |
|---|---|---|
| 2,057,807 | 10/1936 | Whitmore . |
| 2,151,573 | 3/1939 | Stanley . |
| 2,420,021 | 5/1947 | Straubel et al. . |
| 3,409,347 | 11/1968 | Vogel . |
| 3,655,960 | 4/1972 | Andree .................... 359/803 |
| 3,945,717 | 3/1976 | Ryder et al. . |
| 4,147,411 | 4/1979 | Barry ....................... 359/805 |
| 4,958,913 | 9/1990 | Schaffer . |
| 5,021,933 | 6/1991 | Cordes ..................... 359/802 |
| 5,031,918 | 7/1991 | Brill ........................ 359/802 |

FOREIGN PATENT DOCUMENTS

| | | |
|---|---|---|
| 0107256 | 5/1984 | European Pat. Off. . |
| 8232211 U | 5/1983 | Germany . |
| 9003214 U | 7/1990 | Germany . |
| 93/12451 | 6/1993 | WIPO . |

*Primary Examiner*—Loha Ben
*Attorney, Agent, or Firm*—Spencer & Frank

[57] ABSTRACT

An optical reading device is provided with a rod-shaped lens body having a first and a second pair of side surfaces extending in the longitudinal direction of the rod and, in pairs, disposed opposite one another. At least one side surface of the first pair of side surfaces is configured as curved surface which is curved convexly in the directions of both the length and the width of the rod. At least one side surface of the second pair of side surfaces has an additional curved surface. In this manner, a magnifying lens with two different magnification options is created.

13 Claims, 4 Drawing Sheets

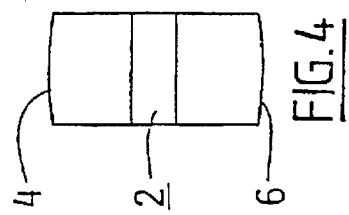
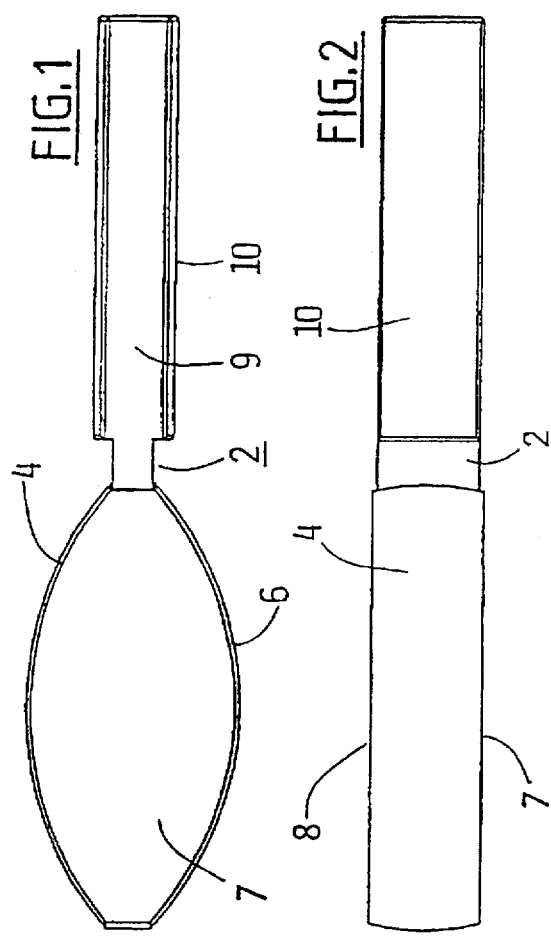
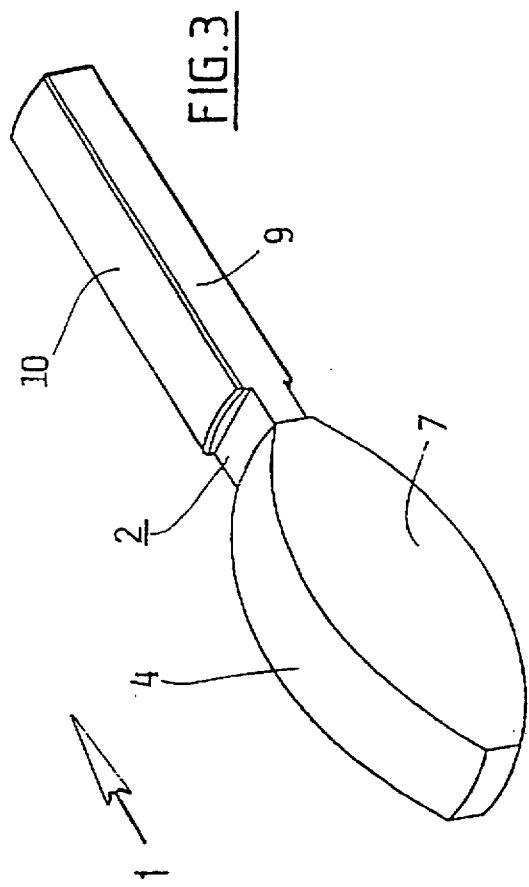

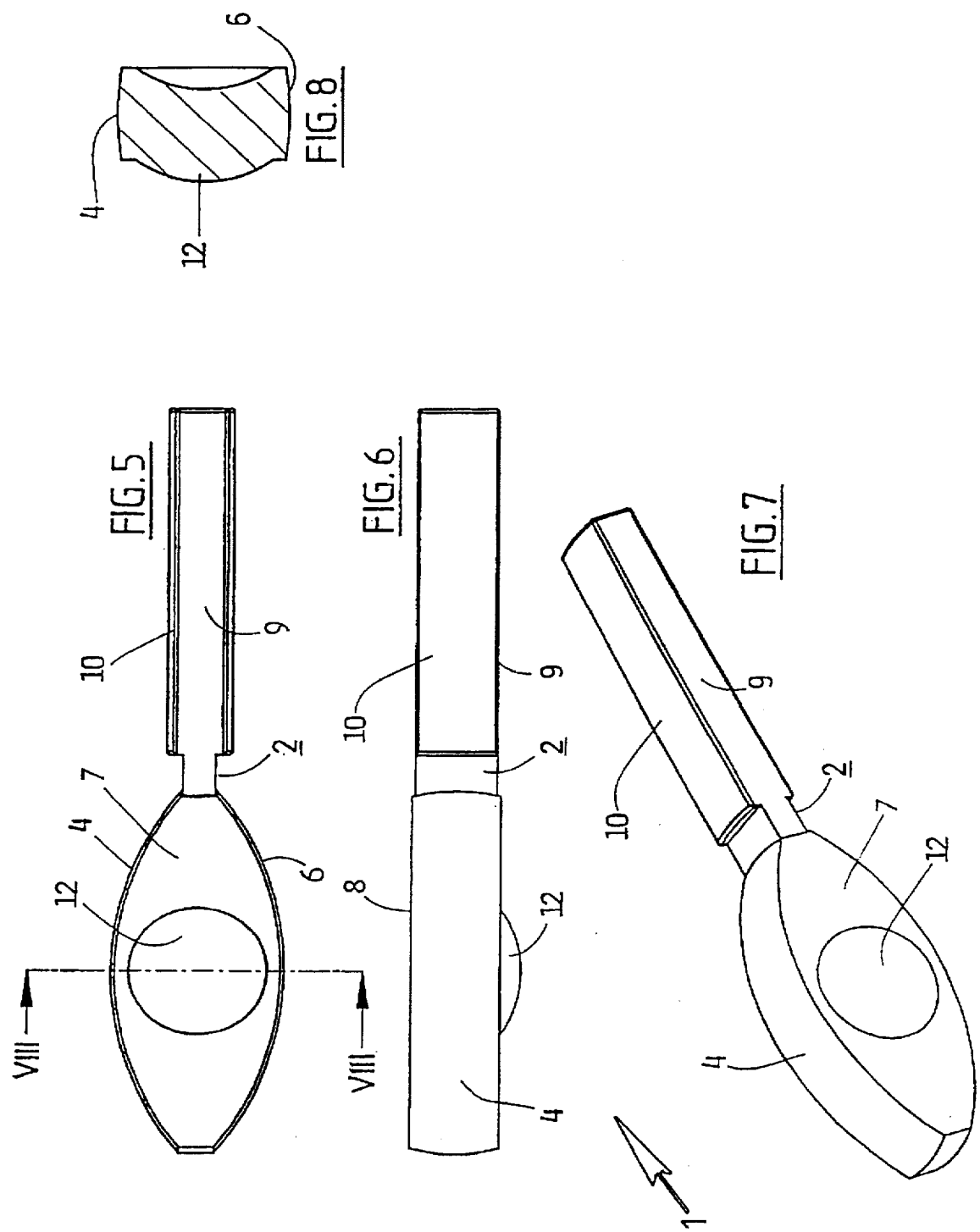

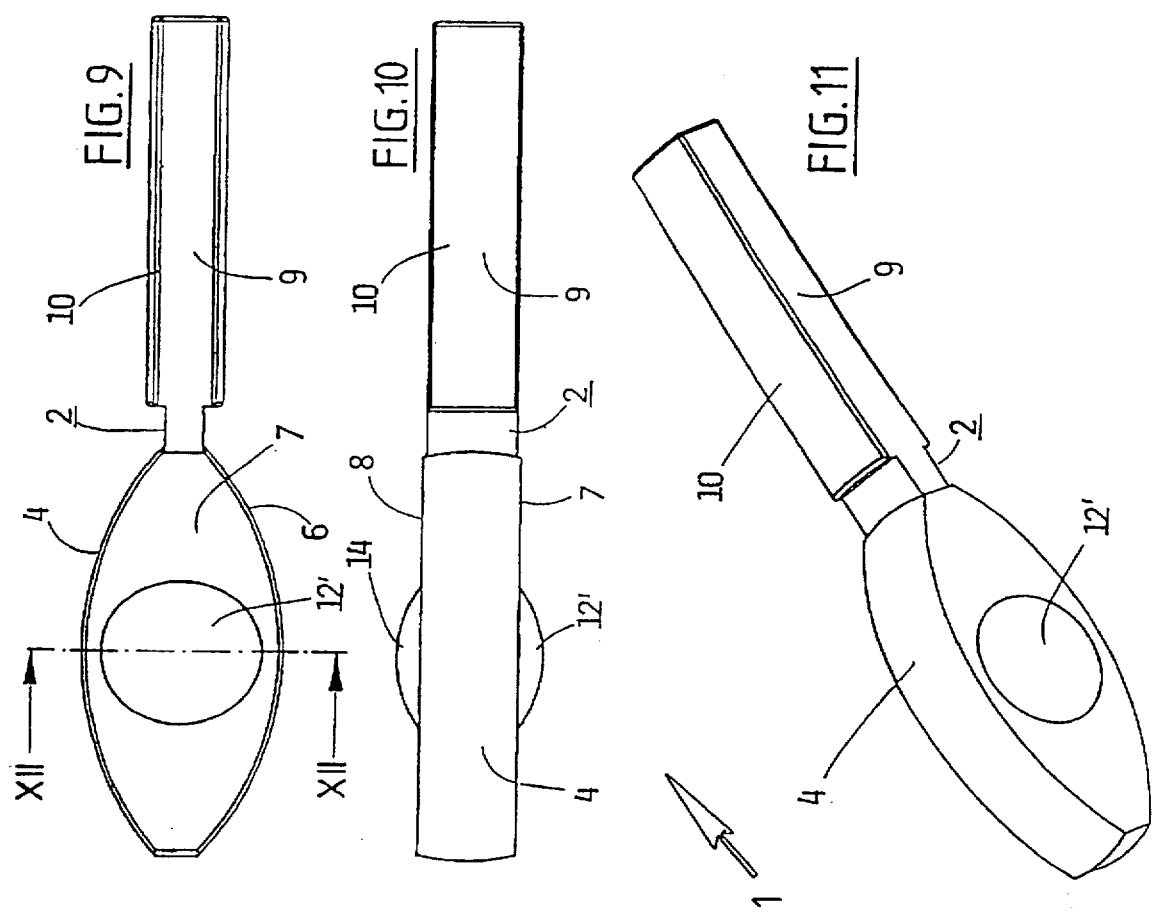

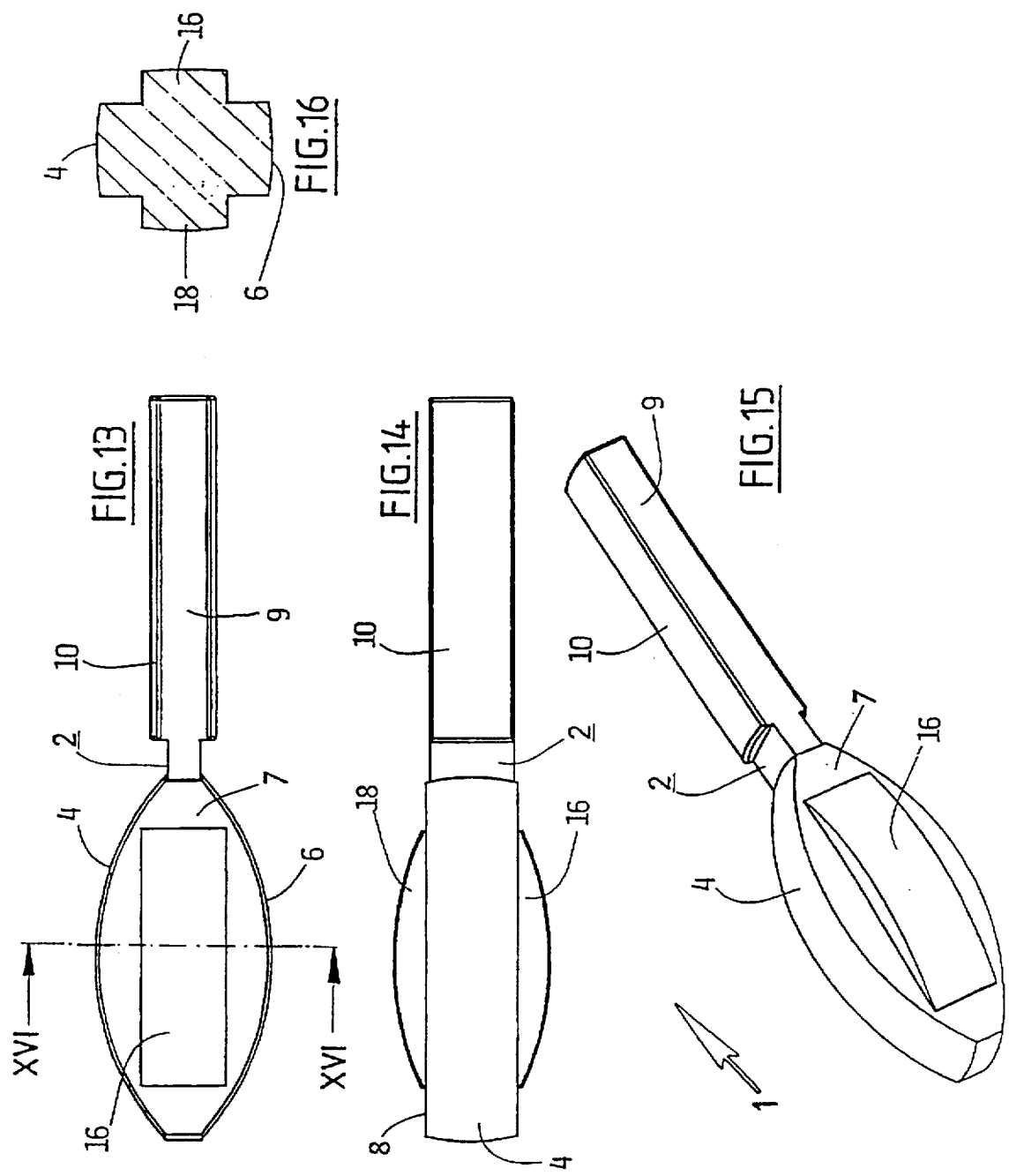

OPTICAL READING DEVICE

BACKGROUND OF THE INVENTION

The invention relates to an optical reading device having a rod-shaped lens body.

So-called reading rods, or line-reading magnifying lenses, are known in different embodiments, for example from the publications U.S. Pat. No. 2,420,021, U.S. Pat. No. 2,151,573 and U.S. Pat. No. 2,057,807 and European Patent Application 0 107 256 and German Utility Model G 82 32 211. They typically serve as a magnifying aid in reading an item, for example in reading lines of print. The essential feature of these known reading rods lies in the cylindrical shape of their lens bodies or surfaces. Typically, only the view-through surface of the top side is cylindrical, whereas the surface to be placed onto the item to be read, namely the underside, is planar.

Reading rods of this type only magnify in one direction. If the direction of the rod is identical to the direction of the line, the line is only magnified in height, and hence only perpendicular to the item to be read. Moreover, only slight enlargements, for example of 1.8 times, can be attained.

Reading magnifying lenses having a rectangular contour shape are also known, wherein at least one curved surface of the lens body is configured to be convex in the directions of both the length and the width of the rod, with the lens body having two plane-parallel side surfaces extending transversely to the longitudinal direction of the rod.

But such lenses have the drawback that only a single magnification is available to the user. If a different magnification is desired, a second lens having the desired magnification must be made available. It would also be conceivable to provide a reading device of the type in question with several lenses of different magnification. But this would increase the weight of such a device and impair its ease of handling.

SUMMARY OF THE INVENTION

On this basis, it is the object of the invention to create a reading device which is simple in its construction and easy to handle and which has at least two different degrees of magnification.

This object is solved by providing an optical reading device that comprises a rod-shaped lens body having a first and a second pair of side surfaces extending in the longitudinal direction of the rod and, in pairs, disposed opposite of one another. At least the one side surface of the first pair of side surfaces is configured as a curved surface which is curved convexly in the directions of both the length and the width of the rod. At least one of the side surfaces of the second pair of side surfaces is provided with an additional curved surface. Thus it is possible in a very simple manner to change over from the one view formed by the first pair of side surfaces to a second view having a different magnification formed by the second pair of side surfaces, namely by pivoting the optical reading device around its longitudinal axis.

The convex configuration of the surface of the lens body in two dimensions, i.e. in the directions of the height and length of the line to be read, results in a segment-like lens body shape having the same degree of effective magnification in both dimensions. This segment-like lens body shape leads to a considerable reduction in volume with the viewing field being particularly wide at the same time.

The surface curves can be spherical or aspherical. It is preferable to provide spherical curves in the center region of the lens body, in both the x and y directions, which change over to aspherical curves in the edge regions. This compensates for edge distortions which would otherwise be present due to image distortions. This aspect of edge distortion is significant, because a wide viewing field is created which cannot typically be produced by commercially-available round lenses due to the large magnifying lens diameter.

In an advisable embodiment, both side surfaces of the first pair of side surfaces are configured as curved surfaces which are curved to the same extent. That is, the top side or view-through surface as well as the underside facing the line to be read are curved to the same extent. A particularly high degree of magnification, for example of 10 times, can be attained with this measure.

The radius of curvature, of the lens, becomes smaller with an increasing degree of magnification, while the thickness of the lens body, namely the distance between the two curved surfaces (which preferably have the same convex shape) becomes larger. This gives the lens body the spherical segment form with two side surfaces which extend in the longitudinal direction of the rod or line and are plane-parallel with respect to the base structure. The curved top surfaces of this lens body are thus configured to be elliptical in the broadest sense when seen in a vertical plan view of these plane-parallel side surfaces. This is a base form of the lens body.

The advantageous modifications disclosed as follows build upon this base form, which has the highest degree of magnification.

The lens body is advisably injection-molded in one piece from polymethyl methacrylate (PMMA). As an alternative, however, a polycarbonate core extending over the entire length of the rod and in the center of the lens body can be provided on both sides with a PMMA bed which supports the lens curvatures on its two outer surfaces in order to create a triplet. Such triplets are used to correct color aberrations due to chromatic aberrations. It is also-advisable to configure the lens body as an achromatic lens through a combination of a convex and a concave surface in order to eliminate image distortions caused by chromatic aberrations.

The additional curved surfaces of the second pair of side surfaces may be configured differently. These lenses can be spherical round lenses or, again, aspherical strip-shaped or line magnifying lenses. With this measure, a second lens or a second magnifying lens is essentially created which has a different degree of magnification, regardless of whether it is a large or small degree of magnification in comparison to the main lens.

This concept can also be implemented in a third dimension in that a third lens can be added to or injection molded along with the others in the direction of the height of the characters to be read, that is, in the direction of the width of the rod. This produces different degrees of magnification in a viewing field. This type of reading device can include a lens body having three degrees of curvature in the curved surfaces oriented in the three dimensions.

The advantages attained with the invention, in particular a good overview of an item to be read (peripheral vision) and, at the same time, rapid and accurate reading are made possible by the convex configuration of the curved surface, or each curved surface, in the directions of both length and width of the lens body. A close proximity of the upper and lower edges of the lens body is especially advantageous do that, for example, no more than three or four lines of a typical newspaper item are in the viewing field of the reading device.

The outwardly-oriented arching of the lens body in two dimensions, namely in the directions of the length and width of the line to be read, results in a reduction in the height of the lens body, and thus a short lens diagonal, so that, in comparison with large-surface, rectangular reading lenses, greater rod or lens body widths can be realized with the same center thickness of the lens body. This leads to a high comfort level for the user during reading and an especially high reading speed.

BRIEF DESCRIPTION OF THE DRAWINGS

For a more detailed explanation of the invention, embodiments are described in conjunction with the drawing figures. Shown are in:

FIGS. 1, 2, 3 and 4, show a side view, a plan view, a perspective view and a cross section, respectively, of a base form of an optical reading device according to the invention.

FIGS. 5, 6, 7 and 8, show a reading device which additionally has a high-magnifying, round lens, with FIG. 8 showing a section along line A—A in FIG. 5, FIGS. 9 through 12, show a further embodiment of the lens body additionally having two lateral, round lenses, and FIGS. 13 through 16, show an embodiment of the lens body additionally having two lateral, aspherical lenses.

DETAILED DESCRIPTION OF THE INVENTION

Parts that correspond to each other are provided with the same reference numerals in all figures.

An optical reading device 1 encompasses a rod-shaped lens body 2, whose top side 4 and underside 6 facing the item to be read (not shown) are curved convexly in the directions of both the length and width of the rod. The top side 4 forms the view-through surface, and forms a curved surface, while the underside 6 represents the surface facing the item to be read (not shown) or support surface, and forms a further curved surface. Here, the top side 4 and the underside 6 form a first pair of side surfaces. The curvatures in the direction of the rod width can be seen in FIGS. 4, 8, 12, and 16. The lens body 2 in its base form has essentially plane-parallel side surfaces 7, 8, which form a second pair of side surfaces; and A handle 9 is either attached to the lens body 2 in the longitudinal direction of the rod, or produced with it from one piece. Handle parts 10, which are placed on top, and are arched in the direction of the width of the rod, and are preferably made of plastic, permit slip-free holding during the intended use of the reading device 1.

The optical reading device 1 advantageously serves as a binocular reading or magnifying aid, that is, it can be used by both eyes, for high magnifications and large viewing fields. It is therefore particularly suited for a farsighted user who is accustomed to holding the item to be read at a great distance from himself and reading with both eyes. Holding or following a line of a printed item is facilitated considerably for a visually-impaired user.

The number of diopters of the reading device 1 can also be above eight diopters corresponding to a magnifying lens.

The reading device 1 is also advantageously suited for a great distance between the eye and lens body 2, corresponding to a conventional reading lens. In order to create the largest possible viewing field, also with the above-mentioned great distance, the width of the rod can be selected to be particularly large. The aspherical embodiment of the lens body 2 permits a sufficient rod width with a favorable or tolerable thickness, namely the distance between the curved surfaces of the top side 4 and the underside 6, particularly in the center of the lens body 2.

In the embodiments according to FIGS. 5 through 8, an additional magnifying lens 12 is provided in the form of a round lens, which is disposed on one of the plane-parallel side surfaces 7 or 8 This lens 12, which is highly-magnifying at close range, is activated by a 90° rotation of the lens body 2 with respect to its normal position of use (i.e., with the underside 6 facing the item to be read).

In the embodiment according to FIGS. 9 through 12, the lens body 2 has a further round lens 12' or 14 on each of the plane—parallel side surfaces 7 and 8. This creates—in the manner of a Galilean optics—an additional magnification option for the long range.

In the embodiment according to FIGS. 13 through 16, the second magnifying lens, which can be activated by a 90° rotation of the lens body 2, is a magnifying lens comprising two aspherical lenses 16 or 18 disposed on the plane-parallel side surfaces 7 and 8. The degree of magnification is less than that of the main magnifying lens limited by the curved surfaces of the top side 4 and the underside 6.

The ratio of rod width to rod length of the lens body 2 is advantageously between 1:3 and 1:10. Advisable examples of length-width dimensions are, for example 120 mm by 20 mm, 125 mm by 25 mm or 140 mm by 25 mm, etc. With these ratios, particularly short lens diagonals or lens body diagonals can be attained A lower volume of the lens body 2 and a lower molding weight consequently results, which provides for a very compact visual aid. Short molding times in the production process lead to a particularly economical production of the reading device 1.

What is claimed is:

1. An optical reading device having a rod-shaped lens body, the lens body having a length extending in a longitudinal direction, and a width extending in a direction transverse to the longitudinal direction, the lens body comprising:

a first pair of side surfaces extending in the longitudinal direction of the lens body and being disposed opposite one another, at least one of the side surfaces being curved convexly in directions of both the length and width of the lens body; and a second pair of side surfaces connected to said first pair of side surfaces, extending in the longitudinal direction of the lens body, and being disposed opposite one another, at least one of the side surfaces of the second pair of side surfaces having a curved portion.

2. The optical reading device defined in claim 1, wherein the curved side surface of the first pair of side surfaces is spherically curved in a center region thereof, and aspherically curved in edge regions adjoining the center region.

3. The optical reading device defined in claim 1, wherein the first pair of side surfaces define a top side and an underside, respectively, of the body, said top side and said underside being equally curved.

4. The optical reading device defined in claim 1, wherein the curved portion comprises a spherical round lens.

5. The optical reading device defined in claim 1, wherein the curved portion comprises an aspherical, strip-shaped lens.

6. The optical reading device defined in claim 5, wherein the strip-shaped lens extends essentially over the entire length of the lens body.

7. The optical reading device defined in claim 1, wherein the first pair of side surfaces has a different magnification than the second pair of side surfaces.

8. The optical reading device defined in claim 1, wherein the lens body has a rod width to rod length ratio in the range of about 1:3 to about 1:10.

9. The optical reading device defined in claim 1, wherein the lens body further comprises a handle attached thereto and extending in the longitudinal direction.

10. The optical reading device defined in claim 1, wherein the lens body comprises an injection-molded plastic.

11. The optical reading device defined in claim 2, wherein the plastic comprises polymethacrylic acid ester.

12. The optical reading device defined in claim 10, wherein the lens body comprises one piece.

13. The optical reading device defined in claim 10, wherein the lens body comprises multiple layers.

* * * * *